United States Patent Office.

AXEL W. NIBELIUS, OF HACKETTSTOWN, NEW JERSEY, ASSIGNOR OF TWO-THIRDS TO JOHN W. MACKAY, JR., OF NEW YORK, AND WILLIAM P. FERGUSON, OF BROOKLYN, NEW YORK.

PROCESS OF EXTRACTING ALUMINIUM OXID.

SPECIFICATION forming part of Letters Patent No. 544,319, dated August 13, 1895.

Application filed August 17, 1894. Serial No. 520,587. (No specimens.)

*To all whom it may concern:*

Be it known that I, AXEL W. NIBELIUS, of Hackettstown, in the county of Warren and State of New Jersey, have invented a new and useful Improvement in the Method of Extracting Oxid of Aluminium, of which the following is a specification.

My invention relates to an improvement in the method of extracting oxid of aluminum from clay, clay slate, anthracite slate, minerals, and rocks, consisting in subjecting the clay, clay slate, anthracite slate, mineral, or rock, either by itself alone or mixed with pyrites, to a petroleum flame, then treating the oxidized substance with weak acids for lixiviating the alumina, and finally precipitating the alumina.

In carrying the process practically into effect I expose the material, clay, minerals, or rock alone, at a temperature of bright redness, in a reverbratory furnace to the petroleum or petroleum air flame. The petroleum flame is produced by spraying it—for example, by the Archer oil-burner, well known in the arts, in which the spray is produced by letting a stream of petroleum-oil meet a stream or jet of compressed air, which latter diffuses the oil into a finely-divided state, which, when ignited, produces a flame of great oxidizing power. The chemical action of the petroleum flame upon the material at a temperature of bright redness is to render the alumina combined with silica more readily soluble in weak acids. The oxidized material is then treated with weak acids—such, for example, as sulfuric or muriatic acid—a sufficient quantity being introduced to dissolve the alumina, and sebsequently the alumina is precipitated by any well-known method. During this treatment the oxid of iron in the material is made insoluble in the weak acid solutions and therefore is not lixiviated at the same time as the alumina, which latter is therefore obtained in solution free of iron.

When the clay, clay slate, anthracite slate, mineral, or rock contains or has mixed therewith pyrites, or when for purposes of rendering the alumina still more soluble in weak acids I add pyrites to the raw material, I condense in a tower the formed sulfuric acid and utilize this acid for the subsequent lixiviation of the alumina. The chemical action of the petroleum or petroleum-oil flame upon this mixture with pyrites is a most complete one. The sulfur in the pyrites is oxidized to sulfurous acid gas, which again, by the air and the hydrating effect of the flame, is oxidized to sulfuric acid which acts on the alumina silicate, so that silicic acid and sulfate of alumina are formed, the latter being decomposed by the heat into alumina and sulfuric acid, which sulfuric acid is, as stated, condensed in a tower and subsequently used for lixiviation of alumina from the charge.

By mixing with the raw material containing pyrites the chlorid, the sulfate, or bisulfate of an alkali, such as the chlorid of sodium in the form of rock or sea salt, the sulfate or bisulfate of sodium in the form of niter or salt cakes, a more energetic chemical action takes place, because the alumina in the charge is then attacked by both sulfuric and muriatic acid, the result being a complete decomposition of the alumina silicate into alumina and silicic acid.

What I claim is—

1. The process of extracting alumina from clay, clay-slate, anthracite-slate, minerals and rocks, consisting in mixing with the raw material the sulfate or bisulfate of an alkali, then subjecting the mixture while heated to a petroleum air flame, condensing the acid, utilizing the condensed acid for lixiviating the alumina, and finally precipitating the alumina.

2. The process of extracting alumina from clay, clay-slate, anthracite-slate, minerals and rocks, consisting in mixing pyrites with such clay, clay-slate, anthracite-slate, minerals and rocks, then adding to said mixture the chlorid, the sulfate, or bi-sulfate of an alkali, subjecting the mixture, while heated, to a petroleum air flame, condensing the acid, utilizing the condensed acid for lixiviating the alumina and finally precipitating the alumina.

AXEL W. NIBELIUS.

Witnesses:
 IRENE B. DECKER,
 GEORGE BARRY.